United States Patent [19]

Loizeau

[11] Patent Number: 4,474,276
[45] Date of Patent: Oct. 2, 1984

[54] TORSION DAMPING DEVICE FOR AN AUTOMOTIVE CLUTCH PLATE ASSEMBLY

[75] Inventor: Pierre Loizeau, Ville d'Avray, France

[73] Assignee: VALEO, Paris, France

[21] Appl. No.: 349,268

[22] Filed: Feb. 16, 1982

[30] Foreign Application Priority Data

Feb. 27, 1981 [FR] France ............................. 81 03911

[51] Int. Cl.³ ...................... F16D 3/12; F16D 3/14; F16D 13/64
[52] U.S. Cl. .............................. 192/106.1; 192/70.17; 464/85
[58] Field of Search .................... 192/106.1, 106.2, 55, 192/70.17; 464/85, 81

[56] References Cited

U.S. PATENT DOCUMENTS

| 1,723,886 | 8/1929 | Pfaff . | |
|---|---|---|---|
| 1,760,619 | 5/1930 | Woolson | 192/55 X |
| 1,861,251 | 5/1932 | Wemp | 192/106.2 |
| 1,967,322 | 7/1934 | Pearmain | 192/70.17 |
| 2,533,789 | 12/1950 | Goodchild | 192/106.1 X |
| 2,826,902 | 3/1958 | De Coursey . | |
| 2,964,930 | 12/1960 | Aira et al. | 192/106.1 X |
| 3,327,820 | 6/1967 | Maurice | 192/55 |
| 3,809,198 | 5/1974 | Mori | 192/106.2 |
| 3,811,545 | 5/1974 | Sato et al. | 192/106.1 |
| 4,092,837 | 6/1978 | Gebauer et al. | 464/85 |
| 4,156,481 | 5/1979 | Ishida et al. | 464/85 X |

FOREIGN PATENT DOCUMENTS

| 645382 | 7/1962 | Canada | 192/106.1 |
|---|---|---|---|
| 1265509 | 4/1968 | Fed. Rep. of Germany . | |
| 1411155 | 8/1965 | France . | |
| 512009 | 8/1939 | United Kingdom | 192/106.2 |
| 715512 | 9/1954 | United Kingdom | 464/85 |
| 728830 | 4/1955 | United Kingdom | 192/106.1 |

Primary Examiner—Rodney H. Bonck
Attorney, Agent, or Firm—Charles E. Brown

[57] ABSTRACT

A torsion-damping device comprises two coaxial parts which are mounted to rotate relative to one another within predetermined limits of relative angular displacement and which are free axially relative to one another within the predetermined limits of axial spacing, elastic means which are interposed circumferentially between said coaxial parts and which comprise at least one block of elastically deformable material located in a housing which is fast partly with one of said coaxial parts and partly with the other of these, and friction means which act axially between said coaxial parts and which generate between them a frictional torque during their relative angular displacement each of these blocks confined circumferentially in the housing in which it is located, so that when there is a relative angular displacement between the coaxial parts, the or each block generates between the parts an axial force urging them apart, with the result that the frictional torque caused by the friction means is modulated.

22 Claims, 23 Drawing Figures

TORSION DAMPING DEVICE FOR AN AUTOMOTIVE CLUTCH PLATE ASSEMBLY

BACKGROUND OF THE INVENTION

The present invention relates, in general terms, to torsion-damping devices comprising at least two coaxial parts mounted to rotate relative to one another within the limits of a specific angular movement, and elastic means interposed circumferentially between said coaxial parts.

As is known, such a torsion-damping device conventionally forms part of a clutch plate assembly, especially for a motor vehicle, in which case one of its coaxial parts carries a friction disc intended to be made to rotate integrally with a first shaft, in practice a driving shaft, the output shaft of the engine in the case of a motor vehicle, whilst the other of its coaxial parts is carried by a hub intended to be made to rotate integrally with a second shaft, in practice a driven shaft, the input shaft of a gear box in the case of such a motor vehicle.

Such a device makes it possible, in fact, to ensure regulated transmission of the torque applied to one of its coaxial parts when the other is itself subjected to a torque, that is to say to filter the vibrations capable of arising over the entire length of the kinematic chain in which it is inserted and which extends from the engine to the controlled wheel shafts in the case of a motor vehicle.

Most often, the elastic means interposed circumferentially between the two coaxial parts constituting this device are formed by a plurality of springs, made in practice of metal, substantially elongated tangentially in relation to a circumference of the assembly.

However, it has already been proposed to substitute for such springs blocks made of elastically deformable material, this being the case, in particular, in U.S. Pat. No. 3,811,545.

In both cases, namely springs or blocks made of elastically deformable material, such elastic means are located in housings integral partly with one of the coaxial parts constituting the torsion-damping device in question and partly with the other of these coaxial parts; they are therefore subjected to a circumferential compressive force during the angular movement between said coaxial parts, and it must be emphasised, when blocks made of elastically deformable material are concerned, that, according to what may be considered a prejudice, it has therefore been conventional hitherto to make such blocks work under compression only, in the same way as the springs for which they are substituted.

The present invention relates, more particularly, to torsion-damping devices of the type in question, which also possess friction means which act axially between their constituent coaxial parts and which therefore generate between these a friction torque during their angular movement.

Such a friction torque, the purpose of which is to increase the damping of angular oscillations or vibrations between the two coaxial parts constituting the torsion-damping device in question by being added to the friction torque caused by the internal friction which the latter inevitably has, introduces, during operation, into this torsion-damping device a "hysteresis" effect, that is to say a differentation, for one and the same angular movement between said coaxial parts, between the value of the torque transmitted between these for an increase in development of this torque and the value of the torque transmitted between these coaxial parts for a decreasing development thereof.

In practice, it is advantageous if this differentation is the greater, the higher the torque transmitted.

Various expedients have been proposed for this purpose.

For example, in U.S. Pat. No. 3,811,545, mentioned above, projections integral with one of the parts of the torsion-damping device in question come in friction contact, as a function of the angular movement between the coaxial parts constituting this device, with the seat of the blocks of elastically deformable material which are interposed circumferentially between said coaxial parts.

Moreover, benefiting from the fact that the two coaxial parts of a torsion-damping device of the type in question are conventionally free axially relative to one another within the limits of specific axial spacing, it has been proposed, in French Pat. No. 1,411,155, to arrange obliquely at least some of the springs used, so that the elastic force caused by these has an axial component designed to provide progressive clamping of the friction means intervening axially between said coaxial parts.

The various corresponding embodiments are relatively complex.

Furthermore, and possibly with the exception of the last, they lead to variations in the friction torque occurring by increments and therefore to a hysteresis varying correspondingly by increments.

The subject of the present invention, is, in general terms, an arrangement which, taking new advantage of the use of blocks of elastically deformable material, permits, in a simple and effective way, a continuous variation in the hysteresis and also leads to other advantages.

SUMMARY

More precisely, the subject of the present invention is a torsion-damping device, particularly a clutch plate assembly, especially for a motor vehicle, of the type comprising two coaxial parts which are mounted to rotate relative to one another within the limits of a specific angular movement and which are free axially relative to one another within the limits of a specific axial spacing, elastic means which are interposed circumferentially between said coaxial parts and which comprise at least one block of elastically deformable material located in a housing integral partly with one of said coaxial parts and partly with the other of these, and friction means which act axially between said coaxial parts and which generate between these parts a friction torque during their angular movement, this torsion-damping device being characterised in that, for each of the coaxial parts in question, the housing in which the block of elastically deformable material is located possesses at least one circumferentially continuous line from one of its circumferential ends to the other, called a contact line below, so that, over at least one range of the angular movement between said coaxial parts and at least along said contact line, said block of elastically deformable material is confined circumferentially in said housing.

In other words, from one of the circumferential ends of such a housing to the other and at least along a so-called contact line, the corresponding wall of this housing extends continuously, without a break in continuity, and is therefore capable of buttressing at all points the block of elastically deformable material.

The originality of this arrangement will emerge more clearly if it is remembered that, most often, in embodiments of the type in question which have been known hitherto, there is circumferentially a break in continuity in the wall of the housings in which are located the elastic means interposed between the two coaxial parts constituting the torsion-damping device in question.

This is the case, particularly, in U.S. Pat. No. 3,811,545, in which the wall concerned is, in fact, non-existent, the blocks of elastically deformable material constituting the corresponding elastic means simply bearing, with their circumferential end portions, against the portions of apertures provided, for housing these blocks, in the two coaxial parts constituting the torsion-damping device in question.

In practice, since the housing of the block of elastically deformable material comprises two shells, the concavities of which are turned towards one another and which each have circumferentially at least one circumferentially continuous line from one of their circumferential ends to the other, forming a contact line for the block of elastically deformable material, for at least one range of the angular movement between the coaxial parts in question, said shells are, according to the invention, connected circumferentially one to one of the coaxial parts in question and the other to the other of these, instead of both belonging to one and the same coaxial part, and they alone jointly form said housing.

The result of this is that, during the angular movement between the coaxial parts in question, the block of elastically deformable material is subjected not only to a circumferential compressive force, but also, according to a characteristic of the invention, to a shearing force, and the points of application of this circumferential compressive force at the ends of said block of elastically deformable material are not aligned circumferentially with one another, but are, on the contrary, offset axially relative to one another.

Because of the circumferential compressive force to which it is subjected, the block of elastically deformable material undergoes axial swelling which is increased as a result of the combination of a shearing force with this circumferential compressive force.

Because of this axial swelling and its confinement in the housing in which it is located, the block of elastically deformable material used in the torsion-damping device according to the invention generates, between the coaxial parts constituting this device, an axial spacing force which increases with the angular movement between said parts.

The friction torque caused by the associated friction means is consequently increased progressively.

This increase in the friction torque occurs advantageously from the start of the angular movement between the two coaxial parts in question and proceeds continuously to the end of this.

A continuously variable hysteresis is thus obtained in a relatively simple way, without any elements needing to intervene for this purpose, other than the elastic means in any case interposed circumferentially between the two coaxial parts in question.

Furthermore, despite its axial swelling, the block of elastically deformable material used in the torsion-damping device according to the invention advantageously does not undergo any relative circumferential displacement in respect of the housing which confines it, and it is therefore not subject to wear.

According to a development of the invention, in addition to their function of transmitting torque from one of these coaxial parts to the other and increasing progressively the hysteresis occurring between these, the block or blocks of elastically deformable material constituting these elastic means can advantageously, if desired, fulfil a third function which is to ensure centering of said two coaxial parts relative to one another, while allowing them, radially, a floating mounting relative to one another.

Admittedly, it has already been proposed, particularly in U.S. Pat. No. 2,826,902, to make the two coaxial parts constituting a torsion-damping device free radially relative to one another within the limits of a specific radial play and to interpose elastic means radially between them to provide them with a floating mounting.

However, in this U.S. Patent, the elastic means used for this purpose consist of elastic washers separate from the elastic means in any case interposed circumferentially between the two coaxial parts in question.

According to the invention, the block or blocks of elastically deformable material interposed circumferentially between such coaxial parts constitute jointly, in themselves, the elastic means interposed radially between these.

The floating mounting sought after is thus advantageously obtained, without the need for any additional specific part.

At all events, the floating mounting thus provided between the two coaxial parts constituting the torsion-damping device according to the invention makes it possible to mitigate very simply the consequences of a possible error of alignment between the driving and driven shafts between which they intervene and, in particular, to prevent, on the one hand, a radial component from arising between said coaxial parts, capable of leading to irregular wear of the friction disc possibly carried by one of these and of making the desired filtration of the vibrations to which they are subjected irregular, indeed even random, for low torque values, and, on the other hand, the development, between the various parts in question, of stresses capable of leading to a "fretting" effect between these.

Briefly, the arrangement according to the invention advantageously makes it possible to achieve a plurality of functions with a reduced number of parts which are simple and of lower cost and which take up only very small space axially.

DESCRIPTION OF THE PREFERRED EMBODIMENTS

These Figures illustrate the application of the invention to the construction of a clutch plate assembly suitable, for example, for equipping a motor vehicle.

The torsion-damping device for such a clutch plate assembly substantially comprises two coaxial parts A, B which are mounted to rotate relative to one another within predetermined limits of angular displacement and which are free to move axially relative to one another within predetermined limits of axial spacing, according to the procedures described in more detail below.

The part A comprises an annular bracket 10A carrying, on its outer periphery, a friction disc 11 and is adapted to be made rotationally fast with a first shaft, in practice a driving shaft, the output shaft of the engine in the case of a motor vehicle (not shown).

The part B comprises, parallel to the bracket 10A of the part A and spaced therefrom, a bracket 10B carried, so as to project radially, by a hub 12 which is rotationally fast with a second shaft, in practice a driven shaft, the input shaft of the gear box in the case of a motor vehicle (not shown).

Elastic means are interposed circumferentially between the parts A, B.

These are, in practice, a plurality of blocks 13 of elastically deformable material which, in the exemplary embodiment illustrated, are uniformly distributed circularly along one and the same circumference of the assembly. In the embodiment illustrated in FIGS. 1 to 5, there are eight of these blocks 13.

Furthermore, in this embodiment, each of the blocks 13 is substantially cylindrical, its axis extending substantially radially and each is, in practice, formed by a length of cylindrical beading of circular cross-section.

Such a block 13 can be made, for example of an elastomer.

At all events, each of the blocks 13 is located in a housing 15 integral partly with one of the coaxial parts A, B and partly with the other of these.

According to the invention, for each of the coaxial parts A, B, the housing 15 in which each block 13 is located possesses at least one line circumferentially continuous from one of its circumferential ends to the other, called here for convenience, a contact line, so that, over at least one range of the angular movement between said coaxial parts A, B and at least along said contact line, such a block 13 is confined circumferentially in the corresponding housing 15.

In practice, such a housing 15 is formed by two shells 16A, 16B, the concavities of which are turned towards one another.

According to the invention, these shells 16A, 16B are connected circumferentially one to the part A and the other to the part B.

In the exemplary embodiment illustrated in FIGS. 1 to 5, they are semi-cylindrical shells, that is to say shells, the cross-section of which is substantially semi-circular and which are open at their radial ends. Their curvature extends circumferentially.

In other words, their axes extend in the radial plane of the assembly which passes through their central region.

In practice, since the brackets 10A, 10B have recesses in the form of apertures 17A, 17B for receiving the blocks 13, the shells 16A, 16B are freely engaged axially one in an aperture 17A of the bracket 10A and the other in an aperture 17B of the bracket 10B, and they each have laterally extending wings 18A, 18B for bearing axially on the corresponding bracket 10A, 10B.

In the exemplary embodiment illustrated in FIGS. 1 to 5, the blocks 13 are complementary to the housings 15 formed by the shells 16A, 16B, and, even when the clutch plate assembly is at rest they are engaged without play in these, as shown.

From that moment, each of these shells 16A, 16B forms for the corresponding block 13, parallel to their axis, an infinity of contact lines circumferentially continuous from one of their circumferential ends to the other, this being from the start of the angular displacement between the coaxial parts A, B.

However, this is not necessarily always so.

On the contrary, only a limited number of contact lines need be provided, indeed even a single one of these, as will emerge below, and/or play can be provided, for when the plate assembly is at rest, between each block 13 and the corresponding shells 16A, 16B, contact lines developing, from that moment, between these members only counting from a specific value of the angular displacement between the coaxial parts A, B.

Of course, because of their infinity, the contact lines in question have not been indicated in FIGS. 1 to 5.

As a result of the fact that, even when the assembly is at rest, they are confined circumferentially in their housings 15, the blocks 13 alone ensure the centering of the coaxial parts A, B relative to one another, in this embodiment.

Furthermore, since a radial play J is deliberately left annularly between the inner periphery of the bracket 10A of the part A and the hub 12 of the part B, a floating mounting is produced radially between these parts A, B, which are free radially relative to one another, within the limits of the specific radial play J indicated above and counter to the elastic means which the blocks 13 constitute.

In practice, in the embodiment illustrated in FIGS. 1 to 5, one of the radial ends 20 or 20' of each block 13 is in contact with at least one of the coaxial parts A, B and, in practice, with both of the parts, and its other radial end 20', 20 respectively is in contact with at least the other of the coaxial parts A, B and, in practice, with both of the parts.

The blocks 13 are thus capable of ensuring an elastic return in a radial direction of the coaxial parts A, B relative to one another in the case of these being moved off-centre.

In the embodiment illustrated by the FIGS. 1 to 5, the region of contact of the radial end portions 20, 20' of the blocks 13 with the parts A, B extends entirely across these radial end portions, so that, when the coaxial parts A, B are moved off-centre relative to one another in this way, resilient actuation of the blocks 13 occurs immediately in their entirety and therefore they act effectively.

However, the coaxial parts A, B which, as mentioned above, are free to move axially relative to one another, are coupled axially to one another by one-way retention means, so that their axial freedom of movement occurs in one direction only, corresponding to an axial bringing together of these coaxial parts A, B relative to one another.

In practice, these one-way retention means comprise, on the inner periphery of the bracket 10A, a first set of ties 22 with a central portion extending substantially axially and, on the outer periphery of the bracket 10B, a second set of ties 22' with a central portion extending substantially axially.

In the embodiment illustrated in FIGS. 1 to 5, these are threaded ties.

Each threaded tie 22 is engaged by screwing into a tapped perforation 23 in the bracket 10B and is thus connected axially to the latter, and, passes with play through notches 24 in the bracket 10A, the notches 24 being disposed on the inner periphery of the bracket 10A. The tie 22 extends beyond this bracket 10A, and comprises a shoulder 25 for bearing on the latter; since this shoulder 25 is formed by the base of the head 26 which such a threaded tie conventionally possesses, the bearing of the latter on the bracket 10A is an axial bearing in this embodiment.

Friction means, adapted to generate between the coaxial parts A, B a frictional torque during the relative angular movement between the parts, are provided in line with the threaded ties 22.

In the embodiment illustrated in FIGS. 1 to 5, the friction means comprises a friction washer 27 inserted between the bracket 10A, on that face of the latter remote from the bracket 108, and a distribution washer 28 bearing on the shoulders 25 of the threaded ties 22.

In practice, and as illustrated, a spacer sleeve 29 is provided around each threaded tie 22 between the bracket 10B and the distribution washer 28.

For example, the friction washer 27 can be engaged, without circumferential play, on the sleeves 29, which extend through passages 31 in the friction washer, so that, from the start of the angular movement between the coaxial parts A, B, the friction washer 27 is rotationally fast with the bracket 10B when it is in contact with the bracket 10A. Alternatively, the friction washers 27 can be engaged with circumferential play on the sleeves 29, so that it is made to rotate with the bracket 10B only after this circumferential play has been absorbed. According to another alternative form, the friction washer 27 can be divided into circular sectors suitably attached, for example by bonding, on the distribution washer 28, the latter than being engaged, with or without play, on the threaded ties 22.

Each of the threaded ties 22' bears axially, by means of the shoulder 25' formed by the base of their head 26' and through the web of the friction disc 11 on the bracket 10A, on that face of the latter remote from the bracket 10B, and passes without play through said web and the bracket 10A, and passes with play through notches 24 in the bracket 10B, the notches 24' being provided on the outer periphery of the bracket 10B. Each tie 22' extends beyond the bracket 10B, and comprises a shoulder 32' formed, in practice, by a nut 33' attached by screwing to its threaded end. By means of the shoulder 32, the tie 22' bears on the bracket 10B and it is therefore, as before, an axial bearing.

In the same way as for the threaded ties 22, friction means are provided to exert a frictional torque at right angles to the threaded ties 22'. The friction means comprises a friction washer 27' disposed between the bracket 10B on that of the latter remote from the bracket 10A, and a distribution washer 28' bearing on the shoulders 32' of the threaded ties 22'.

Between this friction washer 27' and the bracket 10A a spacer sleeve 29' surrounds each threaded tie 22'.

As before, the friction washer 27' comprises passages 31' by means of which it is engaged on the threaded ties 22'. If this engagement is without circumferential play, the friction washer 27' is rotationally fast with the bracket 10A from the start of the angular movement between the coaxial parts A, B when it is in contact with the bracket 10B; alternatively, it can be engaged with a circumferential play on the threaded ties 22', so that it is rotationally fast with the bracket 10A only after this circumferential play has been absorbed. According to another alternative form, the friction washer 27' is divided into circular sectors suitably attached, for example by bonding, to the distribution washer 28', the latter then being engaged, with or without play, on the threaded ties 22'.

Moreover, as will be noted, the threaded ties 22' alone ensure that the friction disc 11 is made rotationally integral with the bracket 10A.

Figure 3:
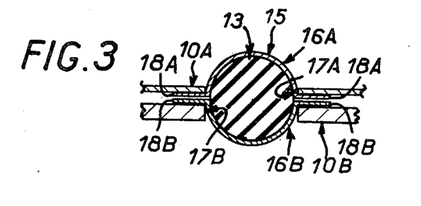
FIG. 3 is a partial view of this, in a circumferential section along the line III—III of FIG. 1 and for a zero angular movement between the two coaxial parts constituting the torsion-damping device in question.

At rest, the shells 16A, 16B constituting the housing 15 for each block 13 are axially opposite one another, as may be seen especially in FIG. 3. The angular movement between the coaxial parts A, B is then zero.

Figures 1, 2:
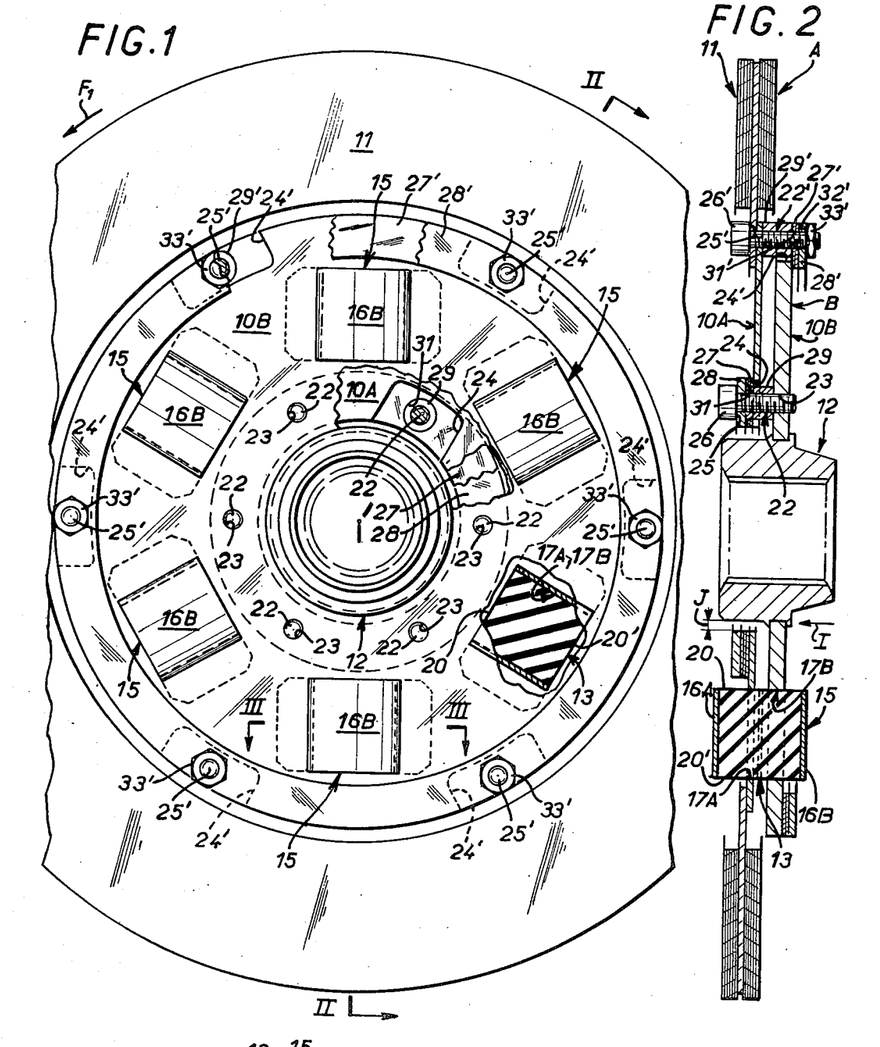
FIG. 1 is a partial elevation view, according to the arrow I of FIG. 2, with various local cutaway portions, of a torsion-damping device according to the invention.
FIG. 2 is a partial view of this, in an axial section along the line II—II of FIG. 1.
Figure 4:
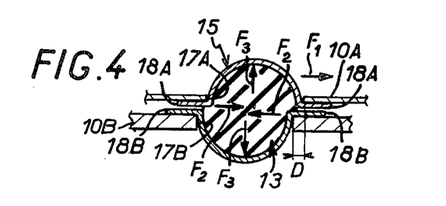
FIG. 4 is a view similar to that of FIG. 3, for any angular movement between said coaxial parts.

During operation, since the friction disc 11 is, for example, driven to rotate in the direction of the arrows F1 in FIGS. 1 and 4, the blocks 13, which transmit the corresponding torque from the part A to the part B, yield elastically, and an angular displacement D then develops progressively between said parts A, B.

At the same time, because of this angular displacement D, each block 13 is subjected to a circumferential compressive force, as indicated by the arrows F2 in FIG. 4, and then works by shearing because the points of application of this circumferential compressive force at its ends are not aligned circumferentially with one another, but are, on the contrary, offset axially relative to one another.

According to the invention, and because each block 13 is confined circumferentially in the housing 15 in which it is located and, because it is thus confined, it works like a fluid without leakage since it consists of an elastically deformable material, such a block 13 generates, between the coaxial parts A, B, an axial spacing force, as indicated by the arrow F3 in FIG. 4, and this axial spacing force is the more intense, the more intense the circumferential compressive force which such a block 13 undergoes, or, in other words, the greater the angular displacement D between the coaxial parts A, B.

The axial spacing force to which the coaxial parts A, B are thus subjected is countered by the threaded ties 22, 22', so that said coaxial parts A, B remain, in practice, spaced axially at the same distance apart.

However, this results in an increasing axial pressure on the friction washers 27, 27', and the frictional torque caused by these is consequently increased.

For a zero angular displacement, the frictional torque is low, even zero. It subsequently increases with the angular displacement.

The hysteresis effect resulting from this thus varies continuously over the entire length of the angular displacement between the coaxial parts A, B, increasing with the displacement.

Figure 5:
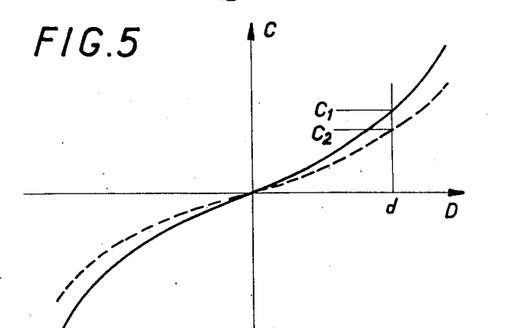
FIG. 5 is a diagram illustrating the method of operation of the torsion-damping device according to the invention.

This hysteresis effect is apparent from the diagram of FIG. 5 in which the angular displacement D between the coaxial parts A, B is plotted on the abscissae and the torque C transmitted from one of these parts to the other is plotted on the ordinates.

For one and the same value d of the angular displacement D, the torqe C has either a value c1 for the increasing torque values or a value c2 for the decreasing torque values, and the difference between these torques c1 to c2 increases regularly from zero displacement towards the higher values of relative angular displacement.

It must be emphasised that, advantageously, no friction which would generate wear between each block 13 and its housing 15 occurs during the angular displacement D.

In practice, the friction washers 27, 27' participate appreciably in the transmission of a torque between the coaxial parts A, B, jointly with the blocks of elastically deformable material 13, which is favourable to the absorption of possible vibrations between said coaxial parts A, B.

In the embodiment illustrated in FIGS. 1 to 5, which makes use of two friction washers, the proportion of the torque thus caused by these friction washers under the effect of the axial spacing force generated by the blocks 13 can reach 50%.

Moreover, and as will be noted, advantageously no metallic spring is used, thus avoiding any special and expensive treatment.

Figure 6:
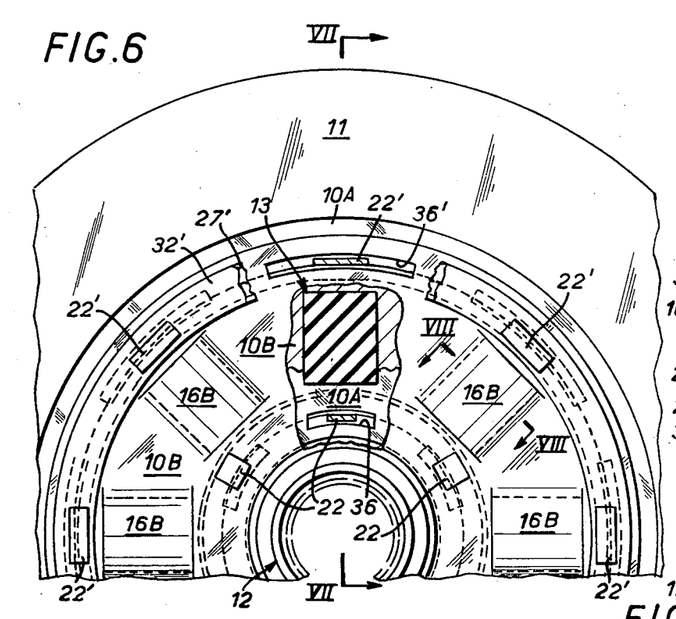
FIG. 6 is a partial view similar to that of FIG. 1 and relates to an alternative embodiment.
Figure 7:
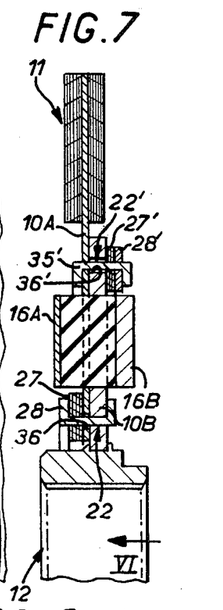
FIG. 7 is a half-view of this alternative embodiment in an axial section along the line VII—VII of FIG. 6.
Figure 8:
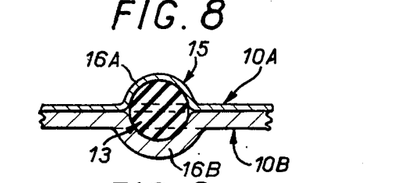
FIG. 8 is a partial view of this, in a circumferential section along the line VIII—VIII of FIG. 6.

In the alternative embodiment in FIGS. 6 to 8, the bracket 10A itself forms the web of the friction disc 11 and it is directly in contact with the bracket 10B.

Furthermore, according to this alternative embodiment, the two shells 16A, 16B forming the housing 15 for each block 13 of elastically deformable material is integrally formed partly with one of the brackets 10A and partly with the other bracket 10B, each part of the housing 15 arising from a local deformation of such a bracket.

Finally, according to this alternative embodiment, the ties 22, 22' forming the one-way retention means coupling the coaxial parts A, B axially to one another consist of lugs made in one piece with one and the same washer.

For the ties 22, it is the distribution washer 28 which bears axially on the bracket 10A via the friction washer 27.

For the ties 22', it is washer 35' which directly bears axially on the bracket 10A.

At all events, at their free ends, and to form bearing shoulders, these lugs are folded back at right angles in contact with the bracket 10B, as regards the ties 22, and in contact with the distribution washer 28', as regards the ties 22', and therefore they all bear axially on the bracket 10B either directly or indirectly.

As before, the ties 22 formed in this way pass with play through apertures 36 provided in the bracket 10A, in the vicinity of the inner periphery of the latter, and they pass, with or without play, through the bracket 10B and the friction washer 27.

Likewise, the ties 22' pass with play through apertures 36', provided in the bracket 10B, in the vicinity of the outer periphery of the latter, and they pass, with or without play, through the bracket 10A and the friction washer 27'.

The operation of this alternative embodiment is similar to that described above for the embodiment illustrated in FIGS. 1 to 5.

In the foregoing, each block 13 is solid.

Figure 9:
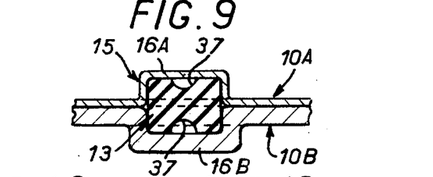
FIGS. 9, 10 and 11 are views similar to that of FIG. 8 and each relate respectively to an alternative embodiment.
Figure 10:
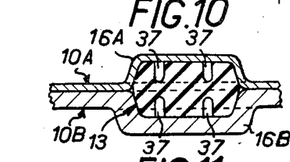

Alternatively, FIGS. 9 and 10, it has recesses; in the exemplary embodiments illustrated, these are open recesses 37, that is to say recesses opening on to one or other of the faces of the block 13 in question, and, in practice, on to both of the transverse faces of this block 13.

In FIG. 9, there is a single recess for each of these transverse faces, and in FIG. 10 there are two for each of these.

Moreover, according to these alternative embodiments, each block 13, is, as in the embodiments illustrated in FIGS. 1 to 8, a length of cylindrical beading, but its cross-section, taken circumferentially, is other than semi-circular.

It is a rectangular cross-section in FIG. 9 and a trapezoidal cross-section with rounded edges in FIG. 10, and the corresponding shells 16A, 16B have a complementary shape.

At all events, the recesses 37 affect the rigidity of the blocks 13, at least over the first range of the angular movement between the coaxial parts A, B, before they are absorbed by the circumferential compressive force which they undergo.

Their effect is, therefore, to modulate the intervention of these blocks as a function of this movement.

It goes without saying that other types of recesses and/or cross-sections may be envisaged for the blocks 13, especially in accordance with the characteristics desired for these.

Figure 11:
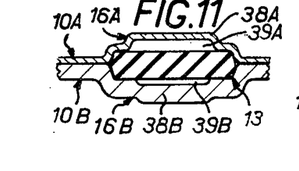

According to the alternative embodiment illustrated in FIG. 11, the cross-section of each block 13 is substantially rectangular with rounded ends, and each shell 16A, 16B forms, between its circumferential ends, an offset 38A, 38B set back axially in relation to said ends, so that, for the position of rest of the clutch plate assembly, there is for each block 13, for the central region of the latter, a recess 39A, 39B between such a block and the corresponding shell 16A, 16B.

As a result, each block 13 is confined and hence constrained circumferentially and therefore generates a substantial axial spacing force only after, for a specific angular displacement between the coaxial parts A, B and under the effects of the circumferential compressive force which it undergoes, it has filled the recesses 39A, 39B as a result of axial swelling.

Figures 12, 14:
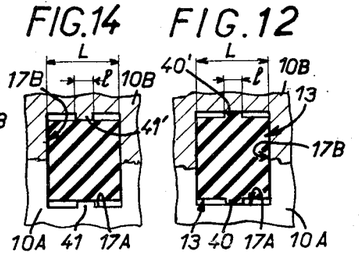
FIG. 12 repeats a part of FIG. 6 and relates to another alternative embodiment.
FIG. 14 is a partial view similar to that of FIG. 12 and relates to an alternative embodiment.
Figure 13:
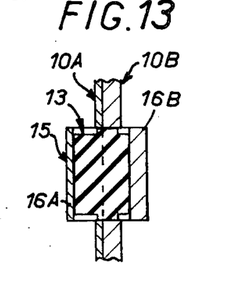
FIG. 13 is a partial view, in an axial section, corresponding to the alternative embodiment shown in FIG. 12.

According to the alternative embodiments illustrated in FIGS. 12 to 14 for at least one of the radial end portions 20, 20' of a block 13, the region of contact of such a portion with the coaxial part A, B in question has a circumferential extent 1 less than that L of the block caught between these radial end portions 20, 20'.

In the embodiment illustrated in FIGS. 12 and 13, the reason for this is that each block 13 has, projecting on each of its radial end portions 20, 20' a stud of reduced cross-section 40, 40', and it is via this stud 40, 40' that it bears on the corresponding portions of the recess 17A, 17B of the brackets 10A, 10B.

Alternatively, FIG. 14, the radial end portions 20, 20' of the block 13 are plane, as in the embodiment illustrated in FIGS. 1 to 5, but the corresponding portions of each recess 17A, 17B of the brackets 10A, 10B have, projecting in their central region, a stud 41, 41' for contact with the block 13.

At all events, such arrangements result in a reduction in the rigidity of the radially acting elastic means formed by the blocks 13 between the brackets 10A, 10B for the floating mounting of the parts A, B.

Figure 15:
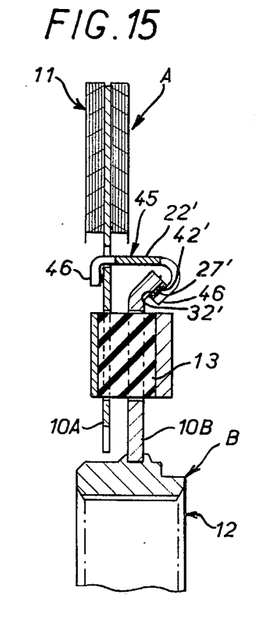
FIG. 15 is a half-view in an axial section similar to that of FIG. 7 and relates to an alternative embodiment.

In the alternative embodiment illustrated in FIG. 15 which is of the type of the embodiment illustrated in FIGS. 6 to 8, the shoulder 32' by means of which a tie 22' bears, via a friction washer 27', on the bracket 10B is oblique to the axis of the assembly, and, for supporting this shoulder, the bracket 10B has, on its outer periphery, a bearing 42' having the same obliqueness.

In practice, in the exemplary embodiment illustrated, said shoulder 32' forms an acute angle with the central axial portion of the tie 22' to which it belongs, and, since several ties 22' are provided, the central portion of these ties is formed by a ring 45 common to all of the ties 22'.

This ring, which extends around a circumference of a diameter greater than that of the outer periphery of the bracket 10B, projects axially on a first side in the form of lugs 46 folded back obliquely, on the inner face of each of which a shoulder 32' is formed, and, on the opposite side, projects in the form of lugs 46 which pass through the bracket 10A and which, folded back at right angles against the latter, and are connected therewith, for example by welding. The tie 22' by means of its bent back lugs 46 has an inherently elastic connection with the bracket 10B.

Apart from the fact that the obliqueness of the shoulders 32' makes it possible to increase, in relation to a transverse shoulder of the same radial bulk, the active surface of the associated friction washer 27' the result of this obliqueness is that, in a radial plane, the pressure between the ties 22' and bracket 10B has a radial component capable of constituting a centering return force for the coaxial parts A, B relative to one another in the event that these are moved off-centre; consequently, it is not necessary, in this case, for the radial end portions of the blocks 13 to be in contact with the coaxial parts A, B.

Figure 16:
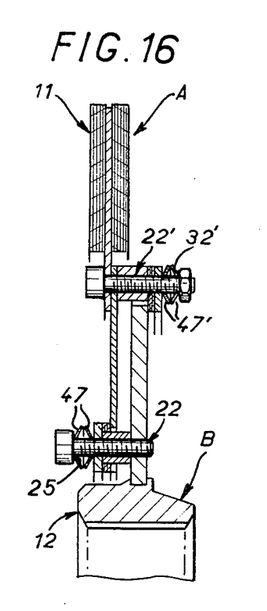
FIG. 16 is a half-view in an axial section similar to that of FIG. 2 and relates to another alternative embodiment.

In the alternative embodiment illustrated in FIG. 16 which is of the type of the embodiment illustrated in FIGS. 1 to 5, a tie 22, 22' bears on at least one of the coaxial parts A, B by means of elastic means with axial elasticity.

In the exemplary embodiment illustrated, these are cup springs 47 for the ties 22 and cup springs 47' for the ties 22', said cup springs being engaged on said ties, in contact with the bearing shoulders 25, 32' associated with the latter.

The cup springs are preferably under prestress. As a result, during the angular displacement between the coaxial parts A, B, these cup springs 47, 47' are, first of all, without effect, in the manner of a rigid thrust bearing.

However, starting from a specific value d1 of said displacement, they yield elastically to the axial compressive force to which they are subjected because of the urging apart of the axial parts A, B.

For a specific value d2 of the angular displacement, they are saturated and again come to have no effect, acting again in the same way as a rigid thrust bearing.

Figure 17:
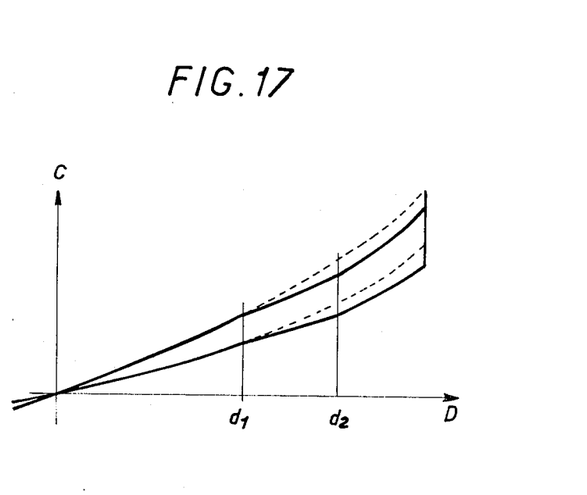
FIG. 17 is a diagram illustrating the method of operation of this alternative embodiment.

They therefore have a specific region of action, in the course of which they temporarily cause, as illustrated by a solid line in the diagram of FIG. 17, a temporary inflexion in the curve representing the torque as a function of the displacement, in comparison with what this curve would be in their absence, as shown by broken lines. Such a modification can be advantageous for some applications.

Figure 18:
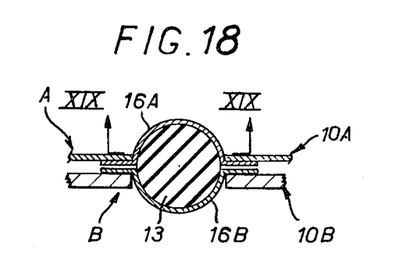
FIG. 18 is a partial view, in a circumferential section, similar to that of FIG. 3 and relates to an alternative embodiment.
Figure 19:
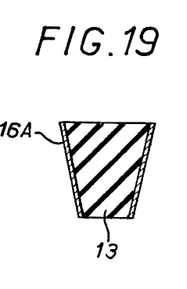
FIG. 19 is a partial view of this alternative embodiment, in a cross-section along the line XIX—XIX of FIG. 18.

In the alternative embodiment illustrated in FIGS. 18 and 19, instead of being cylindrical, as before, each block of elastically deformable material is, radially, substantially frustoconical, its radial end portion nearest to the axis of the assembly having a cross-section less than that of the other, and the shells 16A, 16B serving as a housing for it have a complementary shape.

Such an arrangement is favourable to better distribution of the stresses within the blocks 13 during the circumferential work of the assembly.

Figure 20:
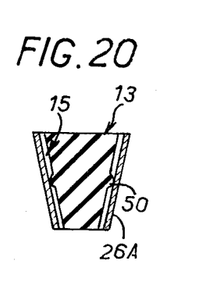
FIG. 20 is a partial view, in a cross-section, similar to that of FIG. 19 and relates to an alternative embodiment.

In the alternative embodiment illustrated in FIG. 20, each block 13 has projecting, for example half-way up, an annular bead 50.

Figure 23:
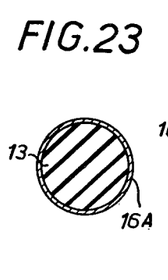
FIG. 23 is a partial view, in cross-section, similar to that of FIG. 19 and relates to another alterntive embodiment which is spherical.

In the further embodiment illustrated in FIG. 23, the block 13 of elastically deformable material is spherical.

In such a case, over at least a portion of the angular displacement between the coaxial parts A, B, the contact between such a block 13 and the shells 16A, 16B of its housing 15 takes place only via the single bead 50. In the embodiment illustrated, the bead 50 has, in cross-section, a rounded section, so that said contact takes place initially only along a single annular contact line corresponding to the top edge of the bead 50.

Several beads 50, can, of course, be provided.

Figure 21:
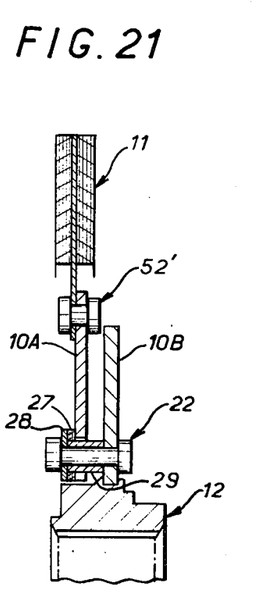
FIGS. 21 and 22 are half-views, in an axial section, similar to that of FIG. 2 and each relates respectively to other alternative embodiments.

In the alternative embodiment illustrated in FIG. 21, the one-way retention means coupling the coaxial parts A, B axially comprise only ties 22, and these consist of rivets. At the same time, the ties 22' are replaced by rivets 52' for fixing the friction disc 11 to the bracket 10A.

In other words, in this alternative embodiment, a single friction washer is used, namely the friction washer 27.

Figure 22:
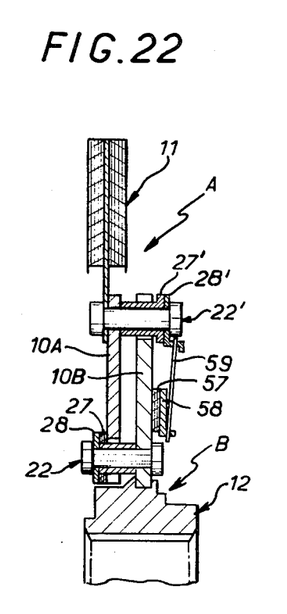

In the alternative embodiment illustrated in FIG. 22, by contrast, three friction washers are used.

In fact, in addition to the friction washers 27, 27', a friction washer 57 supported by a distribution washer 58 is held applied against the bracket 10B by elastic tabs 59 which couple the distribution washer 58 to the distribution washer 28', bearing axially on the latter.

This friction washer 57 thus intervenes from the start of the angular displacement between the coaxial parts A, B.

By contrast, in this alternative embodiment, a play is provided axially between the bracket 10B and the friction washer 27' for the position of rest of the assembly, so that this friction washer 27' intervenes only starting from a specific value of said displacement, when the axial swelling of the elastically deformable blocks 13 is sufficient to have moved the brackets 10A, 10B apart axially from one another a distance equal to the play.

In the foregoing, it has been envisaged that each block 13 is substantially cylindrical or frusto-conical.

According to an alternative embodiment, not illustrated, at least one of the blocks 13 used is substantially spherical.

Moreover, any other shape can be adopted for such a block.

In more general terms, the present invention is not limited to the embodiments described and illustrated, but embraces any alternative embodiment and/or combination of their various elements.

In all cases, the ties coupling to one another the two coaxial parts constituting the torsion-damping device according to the invention essentially work only by traction; in fact, they in no way participate in the transmission of torque between said coaxial parts.

I claim:

1. A torsion damping device for an automotive clutch plate assembly, said torsion damping device comprising two coaxial parts mounted for rotation relative to each other within predetermined limits of relative angular displacement and for axial movement relative to each other within predetermined limits of axial spacing, elastic means circumferentially interposed between said coaxial parts for opposing relative angular displacement, said elastic means comprising a plurality of circumferentially spaced blocks of elastically deformable material located in respective housings, each of said housings comprising one part fixed relative to one of said coaxial parts and another part fixed relative to said other of said coaxial parts, each of said housing parts having a circumferentially continuous zone running from one circumferential end to the other, said housing parts confining the respective blocks along said circumferentially continuous zones of said housing parts during at least a range of relative angular displacement of said coaxial parts for generating frictional torque during relative angular displacement of said coaxial parts, whereby said blocks of elastically deformable material expand axially in response to increased relative annular displacement of said coaxial parts in said range of relative angular displacement and urge said coaxial parts progressively axially away from each other thereby gradually increasing the frictional torque produced by said friction means.

2. A torsion damping device according to claim 1, wherein said one part and said another part of each of said housing are cup-shaped and open facing each other, each of said cup-shaped housing parts having a said circumferentially continuous contact zone running between the respective circumferential ends of the associated blocks, said blocks being in contact with their respective housing parts along the contact zones over said range of relative angular displacement of said coaxial parts.

3. A torsion damping device according to claim 2, wherein each of said housing consists of solely its cup-shaped parts.

4. A torsion damping device according to claim 2, wherein each of said coaxial parts comprises an annular flange with said cup-shaped housing parts being integral portions of the respective annular flanges.

5. A torsion damping device according to claim 2, wherein each of said coaxial parts comprises an annular flange, having a plurality of recesses corresponding to the plurality of blocks, said cup-shaped housing parts being received in said recesses and having wings bearing axially against the respective annular flanges.

6. A torsion damping device according to claim 2, wherein at least one of said cup-shaped housing parts comprises a recess intermediate the circumferential ends thereof defining with a portion the associated block in axial registry therewith a space when said torsion damping device is in its rest position whereby the said associated block is in contact along said continuous zone of contact of said one cup-shaped housing part after an initial range of relative angular displacement of said coaxial parts.

7. A torsion damping device according to claim 1, wherein said blocks of elastically deformable material have recesses.

8. The torsion damping device according to claim 1, wherein said plurality of blocks define a floating mounting of said coaxial parts radially relative to each other consisting of said plurality of blocks, and means for limiting relative radially freedom of said coaxial parts.

9. The torsion damping device according to claim 8, wherein said blocks also have first and second radially opposed side portions, said first side portion of each of said blocks being in contact with at least one of said coaxial parts and said second side portion of each of said blocks being in contact with at least the other of said coaxial parts.

10. The torsion damping device according to claim 9, wherein the circumferential extent of one of said side portions of said blocks is less than the entire circumferential extent of said blocks.

11. A torsion damping device according to claim 1, wherein said blocks have at least one annularly projecting bead.

12. A torsion damping device according to claim 1, wherein said blocks are substantially cylindrical with a substantially radial axis.

13. A torsion damping device according to claim 1, wherein said blocks are substantially frustoconical with a substantially radial axis, the radially inner base of each of said blocks being smaller than the radially outer base.

14. A torsion damping device according to claim 1, wherein said blocks are substantially spherical.

15. A torsion damping device according to claim 1, and comprising means for limiting relative axial movement of said coaxial parts in one axial direction including at least one tie member having a substantially axial central portion and fixed to or bearing axially on one of said coaxial parts on the side thereof axially remote from the other of said coaxial parts, and having a shoulder for bearing against the side of said other coaxial part remote from said one coaxial part.

16. A torsion damping device according to claim 15, wherein said shoulder is oblique to the axis of said torsional damping device, said side of said other coaxial part remote from said one coaxial part having a bearing surface with the same obliqueness as said shoulder.

17. A torsion damping device according to claim 16, wherein said shoulder forms an acute angle with said central portion of said tie member.

18. A torsion damping device according to claim 17, there being a plurality of said tie members, the central portion of each of said tie members comprising a ring common to all of said tie members.

19. A torsion damping device according to claim 17, wherein other elastic means are interposed between said tie member and at least one of said coaxial parts.

20. A torsion damping device according to claim 19, wherein said other elastic means are preloaded.

21. A torsion damping device according to claim 15, wherein said friction means are disposed at right angles to said tie member.

22. A torsion damping device according to claim 1, and a shearing zone disposed axially between the zones of circumferential continuity of the parts of said housing for subjecting said blocks to shearing force during relative angular displacement in said range.

* * * * *